Dec. 22, 1959 — C. R. HARTENSTINE — 2,918,302
TRUCK FRONT WHEEL STEERING AND SUSPENSION ARRANGEMENT
Filed Jan. 8, 1957 — 2 Sheets-Sheet 1

INVENTOR.
Charles R. Hartenstine.
BY
HIS ATTORNEY.

Dec. 22, 1959     C. R. HARTENSTINE     2,918,302
TRUCK FRONT WHEEL STEERING AND SUSPENSION ARRANGEMENT
Filed Jan. 8, 1957     2 Sheets-Sheet 2

INVENTOR.
Charles R. Hartenstine.
BY
William J. Ruano
HIS ATTORNEY.

United States Patent Office 2,918,302
Patented Dec. 22, 1959

2,918,302

TRUCK FRONT WHEEL STEERING AND
SUSPENSION ARRANGEMENT

Charles R. Hartenstine, Leola, Pa.

Application January 8, 1957, Serial No. 633,012

1 Claim. (Cl. 280—97)

This invention relates generally to a wheel suspension for vehicles, and, more particularly, to a front wheel suspension for trucks, tractors and the like.

An outstanding disadvantage of conventional front wheel suspensions for trucks is that they get out of alignment quite frequently. This is due to the fact that conventional front wheels are independently mounted and involve separate mountings which readily get out of alignment due to set or deformation of the springs with wear thus requiring either a realignment or, more frequently, installation of new springs.

A further and outstanding disadvantage of front wheel suspensions for trucks is that they include only single wheels. Therefore, a blowout of a front tire is extremely hazardous inasmuch as great dependence is made upon proper steering of the vehicle during this time, but suitable control cannot be obtained under such conditions and oftentimes the vehicle will turn over and result in serious accidents.

An object of my invention is to provide a novel front wheel suspension for trucks, trailers and the like which is devoid of the above mentioned disadvantages.

A more specific object of my invention is to provide dual wheels for the front steering wheels of a truck or similar vehicle whereby upon occurrence of a blowout, safety will be assured by the other of the dual wheels.

Another object of my invention is to provide a novel steering assembly for the front wheels of a truck, which assembly will assure permanency of alignment of the front wheels, irrespective of long periods of use of the truck or collision with obstacles on the road.

Another object of my invention is to provide a front, unitary, dual wheel assembly which eliminates the necessity of frequent alignment or adjustment thereof and which will provide a strong and rigid construction which can be easily steered and which will provide maximum safety.

Other objects and advantages of my invention will become apparent from a study of the following description taken with the accompanying drawings wherein.

Figures 1, 1A:
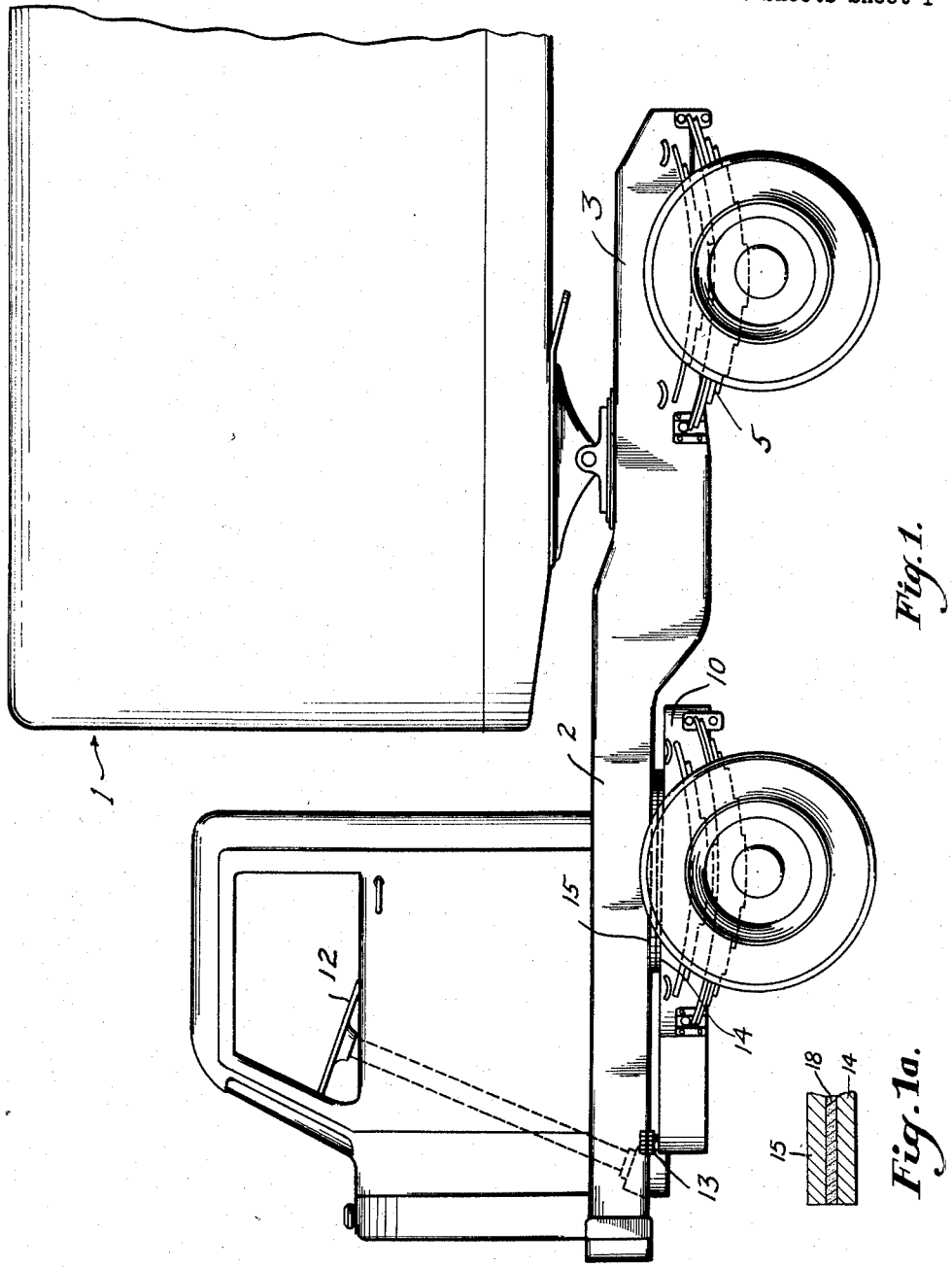
Figure 1 is a side elevational view of a tractor having a front wheel suspension embodying the principles of my invention.
Fig. 1a is an enlarged, fragmentary, cross-sectional view of discs 14 and 15 of Fig. 1.
Figure 2:
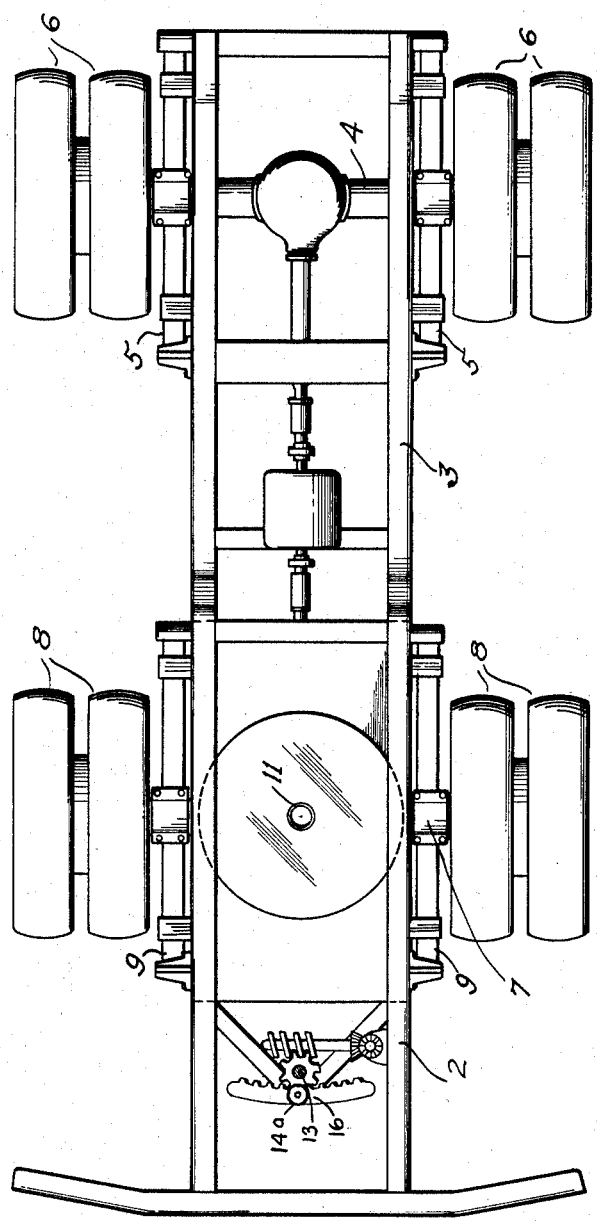
Fig. 2 is a top view thereof with the body removed so as to more clearly show the frame construction and wheel suspensions.

Referring more particularly to the drawings, numeral 1 generally denotes the body of a truck or tractor comprising a frame having a front portion 2 and a rear portion 3 integrally secured together by an intermediate bend so that the front portion will be at a higher level than the rear portion. Suspended from the rear frame portion 3 is a tubular rear axle 4 of conventional and well known construction which is mounted on conventional rear leaf springs 4 supported on the rear frame portion 3. Dual rear pneumatic wheels 6 are mounted at the ends of rear axle 4.

On the front of the vehicle a similar axle and wheel suspension is provided, comprising a tubular front axle 7 on the ends of which are mounted front dual wheels 8. Axle 7 is mounted on a pair of front leaf springs 9 which are fastened to the sides of a swivel base 10 of substantially rectangular construction. Base 10 is adapted to be swiveled about a vertically extended pivot 11. Such swiveling movement of the front wheel assembly is accomplished by turning of the steering wheel 12, which drives a suitable linkage 13 including a worm and pinion which drive a rack 16 rigidly connected at 14a to the arms secured to the front portion of the base plate 10. Thus as the steering wheel is steered in opposite directions, the base plate 10 will swivel about pivot 11 as a center and thus steer the front dual wheels 8.

Suitable bearings are provided for swiveling the front dual wheels and these comprise discs 14 and 15. Disc 14 could be rigidly secured to the top of base plate 10 while disc 15 could be rigidly secured to the bottom of frame portion 2. Preferably, a disc or ring of anti-friction or lubricating material 18, such as graphite, could be interposed between discs 14 and 15 to facilitate swiveling movement of base 10. Or, if desired, another disc may be placed over the horizontal portion of the swivel base 10 which, together with disc 14, could be rigidly secured together, in which instance, anti-friction discs or rings may be inserted between the top disc and base 10 and between the base and disc 14 to provide a bearing surface for steering purposes. Of course, other suitable swivel mounts may be used instead.

Thus it will be seen that I have provided an efficient front wheel suspension for trucks, tractors, trailers and the like, which suspension includes a rigid, hollow front axle construction insuring alignment of the front wheels throughout the entire life of the truck and thus eliminates the necessity of frequent alignments or installation of new springs; furthermore I have provided a front wheel suspension which is of such construction as to enable the mounting of dual wheels, thereby providing maximum safety during steering in case of a blowout.

While I have illustrated and described a single specific embodiment of my invention, it will be understood that this is by way of illustration only, and that various changes and modifications may be made within the contemplation of my invention and within the scope of the following claim.

I claim:

In a truck having a frame, the top level of the front portion of the frame being at a greater height than that of the rear portion, a rigid, hollow front axle having a pair of front dual wheels including pneumatic tires rotatably mounted on the ends thereof, a horizontal rectangular base plate, leaf springs mounted on opposite, longitudinally extending sides of said base for spring mounting said axle and said front dual wheels, said plate being swivelly mounted underneath said front portion of the frame and rotatable about a central, vertically extending pivot, said pivot including disc means including a disc rigidly secured to the bottom of said front portion of the frame and a second disc rigidly secured to the top of said base plate and including anti-friction means between said disc means for facilitating swiveling movements of said plate, and steering means including linkage means connected to the forward portion of said plate for steering the front portion of said plate, whereby steering movements of said front wheels will be effected.

(References on following page)

References Cited in the file of this patent

UNITED STATES PATENTS

| | | |
|---|---|---|
| 424,397 | Williams et al. | Mar. 25, 1890 |
| 655,853 | Collins | Aug. 14, 1900 |
| 1,126,229 | King et al. | Jan. 26, 1915 |
| 1,646,131 | Barnes | Oct. 18, 1927 |
| 1,704,312 | Cover | Mar. 5, 1929 |
| 2,291,626 | Huber | Aug. 4, 1942 |
| 2,468,419 | Weber | Apr. 26, 1949 |
| 2,728,618 | Brown | Dec. 27, 1955 |

FOREIGN PATENTS

| | | |
|---|---|---|
| 84,292 | Norway | Sept. 20, 1954 |